Aug. 6, 1957  C. E. MEEKER, SR  2,801,652
CIRCLE-CUTTING AUXILIARY TABLE JIG FOR BAND SAW TABLES
Filed Aug. 16, 1955  2 Sheets-Sheet 1
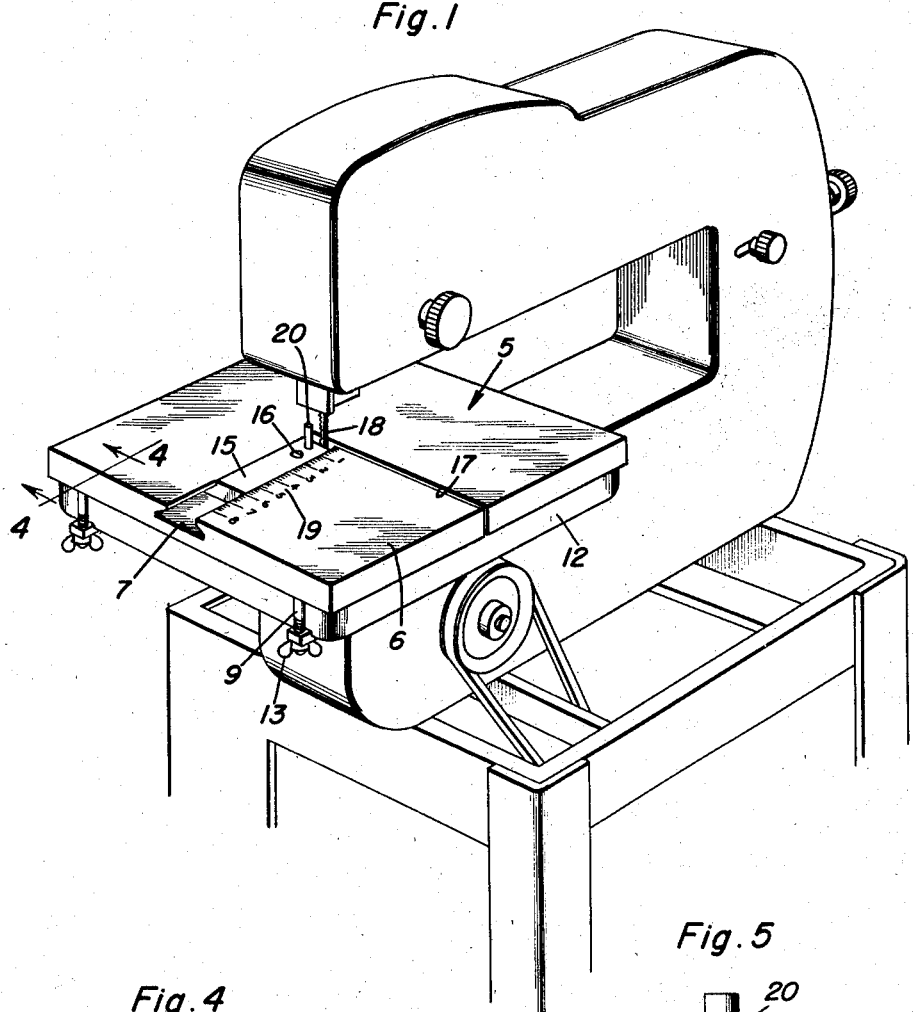
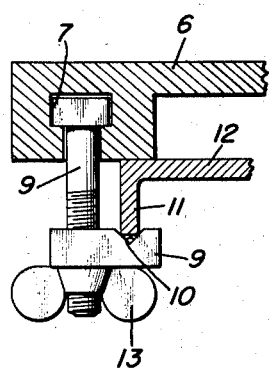
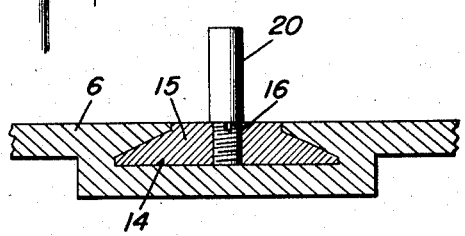
Charles E. Meeker, Sr.
INVENTOR.
BY Aug. 6, 1957     C. E. MEEKER, SR     2,801,652
CIRCLE-CUTTING AUXILIARY TABLE JIG FOR BAND SAW TABLES
Filed Aug. 16, 1955     2 Sheets-Sheet 2

Charles E. Meeker, Sr.
INVENTOR.

United States Patent Office 2,801,652
Patented Aug. 6, 1957

2,801,652

CIRCLE-CUTTING AUXILIARY TABLE JIG FOR BAND SAW TABLES

Charles E. Meeker, Sr., Basking Ridge, N. J.

Application August 16, 1955, Serial No. 528,629

1 Claim. (Cl. 143—26)

The present invention relates to new and useful improvements in band saws and more particularly to a detachable jig for mounting on the saw table to facilitate the cutting of circles as well as for cutting the work along a straight line.

An important object of the invention is to construct the jig with an adjustable gauge to be used for both circle and straight line cutting.

Another object is to provide means for easily and quickly attaching the jig to the regular saw table without necessitating any changes or alterations in the construction thereof and without necessitating removal of the saw.

A further object is to provide an attachment of this character of simple and practical construction which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the saw machine with the jig attached to the saw table;

Figure 4 (Sheet 1) is an enlarged fragmentary vertical sectional view taken on a line 4—4 of Figure 1;

Figure 5 is an enlarged fragmentary vertical sectional view taken on a line 5—5 of Figure 2.

Figure 2:
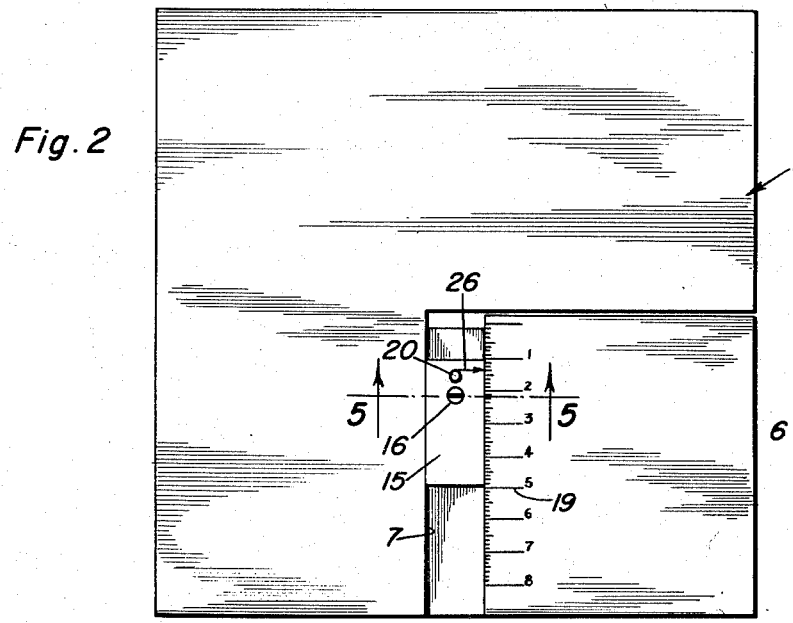
Figure 2 is an enlarged top plan view of the jig.
Figure 3:
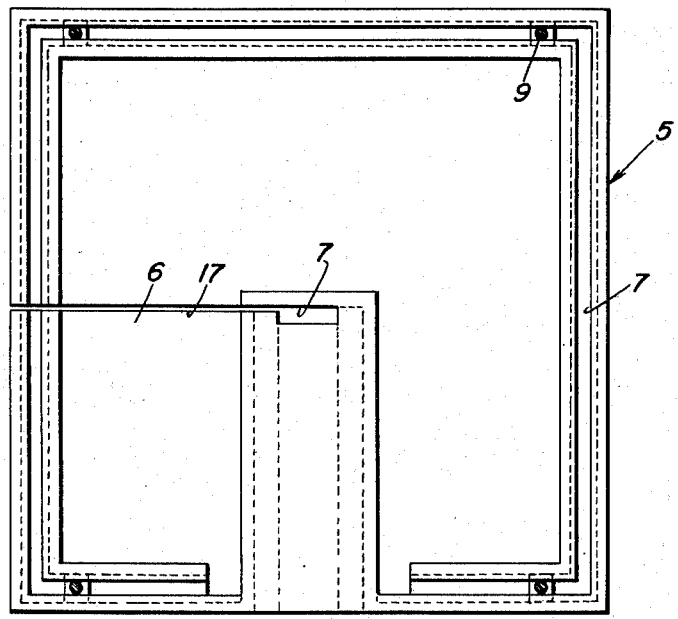
Figure 3 is an enlarged bottom plan view thereof.

Referring now to the drawing in detail, wherein for the purpose of illustration I have disclosed a preferred embodiment of my invention, the numeral 5 designates the jig generally and which comprises a square-shaped plate 6 having T-shaped guide slots 7 at its underside in which the heads of bolts 9 are slidably adjustable and provided with clamping plates 9 having grooves 10 therein for clamping the downwardly projecting flange 11 of a saw table 12 therein by wing nuts 13 to secure the jig on top of the table.

A dove-tail groove 14 is formed in the top of plate 6 to extend inwardly from the front edge of the plate to a point adjacent the center thereof, and a dove-tail slide 15 is secured in slidably adjusted position in the groove by a set screw 16. A slot 17 is formed in the plate 6 to extend from one side edge thereof to the rear portion of groove 14 to accommodate the saw 18 of the saw machine when mounting the jig on the table thereof for operating the saw in the rear portion of groove 14.

Figure 6:
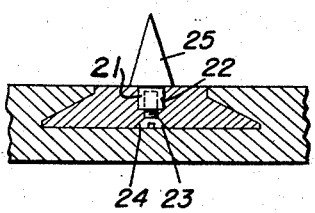
Figure 6 (Sheet 2) is a similar view showing a modified circle cutting pivot.

The surface of plate 6 in the region of groove 14 is provided with a scale 19 graduated in inches and fractions thereof and with which a gauge pin 20 carried by the slide registers. The gauge pin may be cylindrical in shape, as shown in Figure 5, or conical as at 25 in Figure 6 and in either construction the gauge pin is formed at its lower end with a square or non-circular wrench engaging portion 21 received in a complementary shaped opening 22 in the slide 15 and the base portion 21 of the pin is internally threaded to receive a screw 23 which is received flush in a countersink 24 at the underside of the slide to secure the pin in an upstanding position to the slide.

The cylindrical and conical gauge pins 20 and 25 are interchangeably attached to the slide by the screw 23 and the work is placed on the sharpened apex of the conical pin for cutting circular work by turning the latter.

In the operation of the device, the jig is attached to the saw table by the bolts 8 and clamping plates 9 and the slide 15 is adjusted in groove 14 to set gauge pins 20 or 25 according to a desired setting as indicated by the scale 19. An arrow or other suitable straight marker 26 (see Figure 2) is formed on top of the slide in a position to align the rearmost portion of pin 20 or 25 with the graduations of the scale.

When cutting straight work the latter is held against the rearmost portion of pin 20 as the work is fed to the saw and when cutting circular work the latter is placed on top of the conical pin 25 which forms the center of the circle as the work is turned on the jig.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling with the scope of the invention as claimed.

What is claimed as new is as follows:

A jig for a band saw having a rectangular table provided with a depending edge flange around the same, said jig comprising a rectangular plate larger in area than said table to project outwardly thereof when centered on said table, said plate having a groove therein, a center pin slidable in said groove, and a saw band receiving slot intersecting one end of the groove, said plate having a rectangular bottom groove therein of T-shape in cross-section extending around said plate to surround said flange outwardly thereof, headed clamping bolts depending from said rectangular slot and slidably adjustable around the same for variable positioning along selected opposite sides of said flange, and grooved clamping plates on said bolts adapted to be clamped thereby to said flange in straddling relation thereto.

References Cited in the file of this patent

UNITED STATES PATENTS

| 724,433 | Catudal | Apr. 7, 1903 |
| 1,346,504 | Mathison | July 13, 1920 |
| 2,157,310 | Ward | May 9, 1939 |
| 2,720,897 | Kairath | Oct. 18, 1955 |

FOREIGN PATENTS

| 342,792 | Great Britain | Feb. 12, 1931 |